(12) United States Patent
McCorkendale et al.

(10) Patent No.: US 9,734,037 B1
(45) Date of Patent: Aug. 15, 2017

(54) MOBILE APPLICATION SAMPLING FOR PERFORMANCE AND NETWORK BEHAVIOR PROFILING

(75) Inventors: Bruce McCorkendale, Manhattan Beach, CA (US); John P. Kelly, Seattle, WA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1276 days.

(21) Appl. No.: 12/560,328

(22) Filed: Sep. 15, 2009

(51) Int. Cl.
G06F 9/44 (2006.01)
G06F 11/34 (2006.01)

(52) U.S. Cl.
CPC .................... G06F 11/3466 (2013.01)

(58) Field of Classification Search
None
See application file for complete search history.

(56) References Cited

U.S. PATENT DOCUMENTS

| 5,692,111 | A  | * | 11/1997 | Marbry et al. ............... 358/1.15 |
| 5,699,495 | A  | * | 12/1997 | Snipp ........................... 358/1.15 |
| 7,401,359 | B2 | * | 7/2008  | Gartside et al. ................ 726/22 |
| 8,049,677 | B2 | * | 11/2011 | Lum et al. ..................... 345/1.1 |
| 8,161,548 | B1 | * | 4/2012  | Wan ............................... 726/22 |
| 8,161,552 | B1 | * | 4/2012  | Sun et al. ...................... 726/22 |
| 8,270,310 | B2 | * | 9/2012  | Raleigh ............ G06Q 10/06375 370/252 |
| 8,341,268 | B2 | * | 12/2012 | Wang et al. ................... 709/226 |
| 8,346,921 | B1 | * | 1/2013  | Goodspeed et al. .......... 709/224 |
| 8,347,394 | B1 | * | 1/2013  | Lee ................................. 726/25 |
| 8,578,274 | B2 | * | 11/2013 | Druzgalski ....... G06F 17/30241 715/234 |

(Continued)

OTHER PUBLICATIONS

Egan, G., "Not All Reputation Technologies are Created Equal," Symantec Corporation, Sep. 22, 2009, [Online] [Retrieved on Mar. 30, 2010] Retrieved from the Internet<URL:http://www.symantec.com/connect/blogs/not-all-reputation-technologies-are-created-equal>.

(Continued)

Primary Examiner — Henry Tsai
Assistant Examiner — Christopher Bartels
(74) Attorney, Agent, or Firm — Patent Law Works LLP (57) ABSTRACT

Applications on a mobile device are sampled for detecting applications causing performance problems on the device. The method includes periodically logging performance information for a mobile device suspected to be having performance problems. The method further includes periodically logging identifying information about multiple applications on the mobile device. The method also includes periodically providing to a security server the logged performance information for the mobile device and the logged identifying information about the applications. In addition, the method includes, in response to a request from the security server for more information about one of the applications, providing a copy of the application to the security server for analysis of the impact by the application on performance of the mobile device. The method can further include receiving from the security server an indication that the application for which the copy was provided is causing a performance problem on the mobile device.

18 Claims, 6 Drawing Sheets

(56) References Cited

U.S. PATENT DOCUMENTS

| | | | |
|---|---|---|---|
| 8,683,556 B2* | 3/2014 | Ingrassia, Jr. | G06F 21/70 726/2 |
| 2002/0095296 A1* | 7/2002 | Hind et al. | 704/500 |
| 2002/0161826 A1* | 10/2002 | Arteaga et al. | 709/203 |
| 2003/0065755 A1* | 4/2003 | Gunji | 709/221 |
| 2003/0090704 A1* | 5/2003 | Hansen | 358/1.15 |
| 2003/0187922 A1* | 10/2003 | Ohara | 709/203 |
| 2004/0198386 A1* | 10/2004 | Dupray | H04W 64/00 455/456.1 |
| 2005/0078660 A1* | 4/2005 | Wood | 370/352 |
| 2005/0091514 A1* | 4/2005 | Fukumoto et al. | 713/188 |
| 2005/0111856 A1* | 5/2005 | Kawai | 399/8 |
| 2006/0077413 A1* | 4/2006 | Lum et al. | 358/1.13 |
| 2006/0190806 A1* | 8/2006 | Sasson et al. | 715/500 |
| 2007/0002355 A1* | 1/2007 | Kai | 358/1.13 |
| 2007/0006327 A1* | 1/2007 | Lal et al. | 726/31 |
| 2007/0011334 A1* | 1/2007 | Higgins et al. | 709/227 |
| 2007/0083928 A1* | 4/2007 | Mattsson et al. | 726/22 |
| 2007/0192863 A1* | 8/2007 | Kapoor et al. | 726/23 |
| 2007/0226608 A1* | 9/2007 | Virk et al. | 715/513 |
| 2008/0140835 A1* | 6/2008 | Bradley et al. | 709/225 |
| 2008/0262991 A1* | 10/2008 | Kapoor et al. | 706/20 |
| 2009/0036111 A1* | 2/2009 | Danford et al. | 455/419 |
| 2009/0037914 A1* | 2/2009 | Chagoly et al. | 718/101 |
| 2009/0046708 A1* | 2/2009 | Koziol | 370/360 |
| 2009/0303521 A1* | 12/2009 | Kumar | 358/1.15 |
| 2009/0327482 A1* | 12/2009 | Malhotra et al. | 709/224 |
| 2009/0328209 A1 | 12/2009 | Nachenberg | |
| 2010/0005527 A1* | 1/2010 | Jeon | 726/22 |
| 2010/0037321 A1* | 2/2010 | Oz et al. | 726/24 |
| 2010/0210240 A1* | 8/2010 | Mahaffey et al. | 455/411 |
| 2011/0078411 A1* | 3/2011 | Maclinovsky et al. | 712/30 |
| 2013/0066947 A1* | 3/2013 | Ahmad et al. | 709/203 |
| 2013/0254880 A1* | 9/2013 | Alperovitch et al. | 726/22 |
| 2014/0032691 A1* | 1/2014 | Barton | H04L 41/00 709/206 |
| 2014/0032759 A1* | 1/2014 | Barton | H04L 67/10 709/225 |
| 2014/0094159 A1* | 4/2014 | Raleigh | H04W 24/02 455/418 |

OTHER PUBLICATIONS

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

* cited by examiner

MOBILE APPLICATION SAMPLING FOR PERFORMANCE AND NETWORK BEHAVIOR PROFILING

BACKGROUND OF THE INVENTION

Field of the Invention

This invention pertains in general to computer security, and more specifically to sampling and tracking performance problems caused by applications on mobile devices.

Description of the Related Art

Mobile devices are showing an astounding growth in both enterprise and consumer markets. They are used for a wide variety of functions including making phone calls, receiving/sending electronic mail, taking photos, managing a calendar, mapping out geographic destinations, and many others purposes. Software vendors are constantly coming out with new or improved applications for mobile devices. These applications further expand the functionality of mobile devices, allowing users to perform new tasks on these devices, and making them nearly indispensable to many users.

With the continuing growth and popularity of mobile devices and their applications come a number of problems. Users running multiple different applications on their phones sometimes experience a variety of performance issues. These problems include slow device performance, excessively quick battery drain, or other issues that cause a negative user experience. Similarly, certain mobile devices can consume a disproportionately large amount of network resources or bandwidth, or can otherwise cause anomalous or problematic network traffic. Thus, these mobile devices can disrupt not only their users, but can negatively impact the entire network.

Certain ill-behaved mobile applications are often the cause of these types of performance issues. While mobile service providers may be able to trace the network problems to an individual mobile device, or at least recognize anomalous traffic usage in specific geographic areas or time frames, they generally cannot trace the problems to the particular mobile application causing these problems. Thus, they have no way to warn users of certain applications or otherwise prevent these applications from disrupting mobile device usage. Similarly, any type of tool for profiling mobile devices can itself impact performance and battery life.

Therefore, there is a need in the art for a solution that samples and identifies ill-behaved applications for performance and network profiling without itself unduly impacting the mobile device performance.

DISCLOSURE OF INVENTION

The above and other needs are met by a computer-implemented method, computer system, and computer-readable storage medium in which a sampling module samples applications on a mobile device for detecting performance problems. Embodiments of the computer-implemented method comprise periodically logging performance information for a mobile device suspected to be having performance problems. The method further comprises periodically logging identifying information about multiple applications on the mobile device. The method also includes periodically providing to a security server the logged performance information for the mobile device and the logged identifying information about the applications. In addition, the method includes, in response to a request from the security server for more information about one of the applications, providing a copy of the application to the security server for analysis of the impact by the application on performance of the mobile device. In some embodiments, the method further includes receiving from the security server an indication that the application for which the copy was provided is causing a performance problem on the mobile device.

Embodiments of the computer-readable storage medium store executable computer program instructions for sampling applications on a mobile device for detecting performance problems, the instructions comprising instructions for performing the steps of periodically logging performance information for a mobile device suspected to be having performance problems. The instructions further comprise instructions for periodically logging identifying information about multiple applications on the mobile device. The instructions also comprise instructions for periodically providing to a security server the logged performance information for the mobile device and the logged identifying information about the applications. In addition, the instructions comprise instructions for, in response to a request from the security server for more information about one of the applications, providing a copy of the application to the security server for analysis of the impact by the application on performance of the mobile device. In some embodiments, the instructions also comprise instructions for receiving from the security server an indication that the application for which the copy was provided is causing a performance problem on the mobile device.

Embodiments of another computer implemented method of sampling applications on a mobile device for detecting performance problems comprise instructing sampling modules on a plurality of mobile devices to begin sampling or to increase a rate of sampling of applications on the mobile devices. The method further includes periodically receiving, from the sampling modules, logged performance information for each of the mobile devices and logged identifying information about a plurality of applications on each of the mobile devices. The method also includes requesting, from the sampling modules, copies of certain of the applications for which logged information was received. In addition, the method includes analyzing each of the received copies to identify the applications that are conducting behaviors that cause performance problems on the mobile devices. Further, in some embodiments the method includes notifying an entity of the applications that were identified to cause performance problems for mobile devices.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
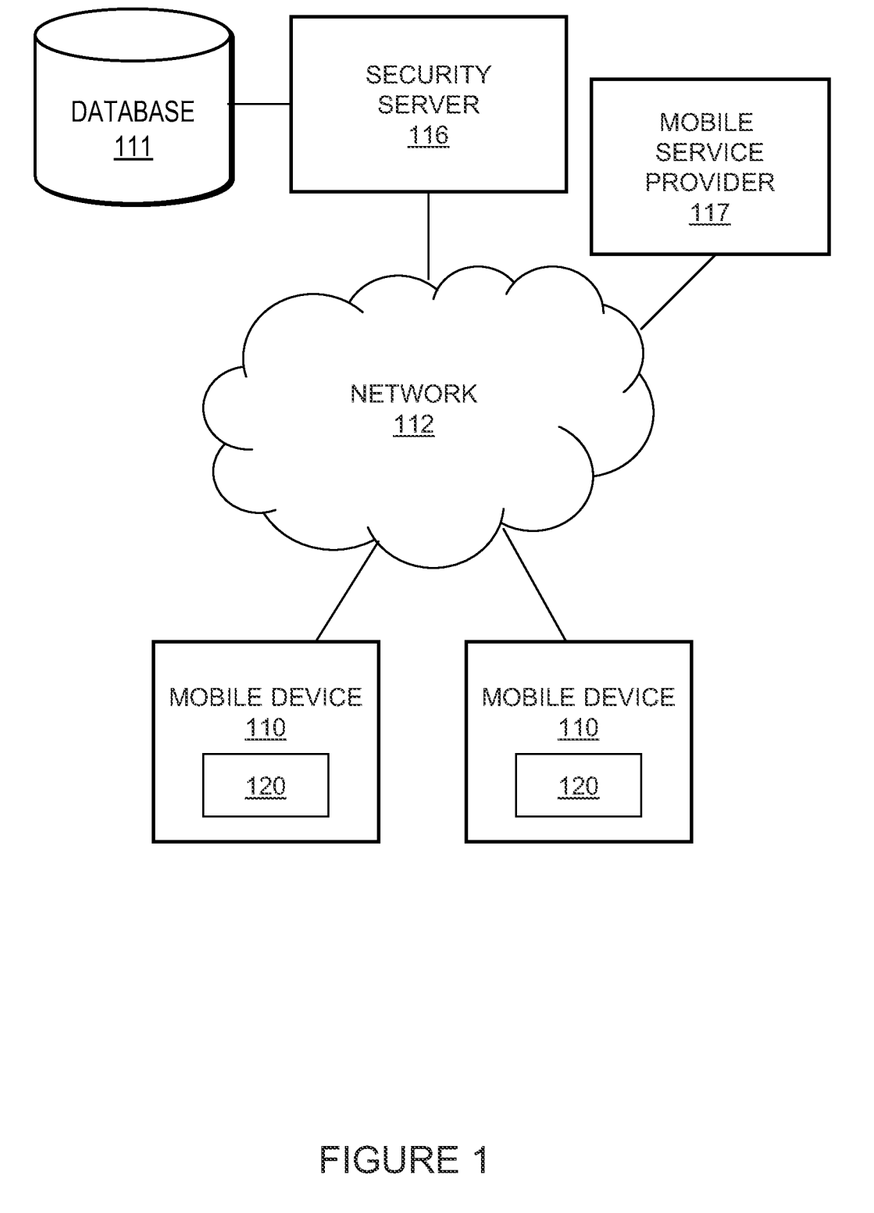
FIG. 1 is a high-level block diagram illustrating an example of a computing environment 100, according to one embodiment of the present invention.

FIG. 1 is a high-level block diagram illustrating a computing environment 100 according to an embodiment. FIG. 1 illustrates a security server 116, a mobile service provider 117, and mobile devices 110 connected by a network 112. Only two mobile devices 110 are shown in FIG. 1 in order to simplify and clarify the description. Embodiments of the computing environment 100 can have thousands or millions of mobile devices 110, as well as multiple servers 116 or mobile service providers 117. In some embodiments, the mobile devices 110 are only connected to the network 112 for a certain period of time or not at all.

The security server 116 serves information or content to mobile devices 110 via the network 112. In one embodiment, the server 116 is located at a website provided by SYMANTEC CORPORATION, although the server 116 can also be provided by another entity. The server 116 can include a database 111 for storing information regarding mobile applications and a web server for interacting with mobile devices 110. The server 116 can send information (e.g., reputation data or results of a performance analysis performed on an application) across the network 112 and to the mobile devices 110 or the mobile service provider 117. For example, the server 116 can receive, from a mobile device 110, applications suspected of causing performance problems on the device, and can conduct a performance analysis of these applications. One or more of the functions of the server 116 can also be executed on the mobile device 110 or in a cloud computing environment. As used herein, "cloud computing" or the "cloud" refers to a style of computing in which dynamically scalable and often virtualized resources are provided as a service over the Internet. For example, a reputation system with which the server 116 interacts regarding reputation data for an application might be operated on the cloud.

The mobile service provider 117 is an entity that provides mobile service to the mobile devices 110. For example, where the mobile devices are cell phones or smart phones, the mobile service provider 117 can be one that provides services wirelessly via a cellular network (e.g., VERIZON WIRELESS, AT&T, T-MOBILE, etc.). In some embodiments, the service is a subscription service provided to the mobile devices 110 for a fee.

The mobile devices 110 are computers or other electronic devices that can interact with the server 116, the mobile service provider 117, or other mobile devices 110. As used herein, a "mobile device" is a computing device designed for mobility that typically has a display, a keyboard, a pointing device, and many other features of a desktop computer, and can communicate wirelessly with the server 116, including portable computers designed to be moved from one place to another. Examples of "mobile devices" include laptops, notebooks, netbooks, smartbooks, ultra-mobile PCs (UM-PCs), and handheld devices (as defined below). In some embodiments, the mobile device is a "handheld device." As used herein, a "handheld device" is a pocket-sized computing device or a device that is sized to be held in the palm of your hand (palmtop device), typically having a display screen with touch input or a miniature keyboard, excluding laptops that are not handheld or palm-sized devices, but including devices such as smartphones, personal digital assistants (PDAs), cell phones or mobile phones, handheld portable media players, handheld game consoles, handheld PCs, handheld UMPCs, and other palm-sized devices.

Many mobile devices 110 can execute a web browser that allows the user to browse and search for information available at a website associated with the server 116. The mobile devices 110 can be network-capable devices, and many mobile devices execute an operating system (e.g., LINUX®, one of the versions of MICROSOFT WINDOWS®, and PALM OS®), which controls the operation of the computer system, and executes one or more application programs. Many mobile devices 110 are also capable of communicating using short-range communication technologies, including Wi-Fi (IEEE 802.11-wireless LAN (WLAN)), BLUETOOTH®, infrared (IR), etc. The mobile devices 110 can perform activities and make requests for or otherwise acquire information from the server 116 or other computers. For example, the mobile devices 110 can send logged identifying information or performance information to the server 116, or can send copies of applications to the server 116 for analysis.

The network 112 enables communications among the entities connected to it. In one embodiment, the network 112 is the Internet and uses standard communications technologies and/or protocols. Thus, the network 112 can include links using technologies such as Ethernet, 802.11, worldwide interoperability for microwave access (WiMAX), cellular or cell phone networks, 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In the embodiment illustrated in FIG. 1, the mobile devices 110 execute a sampling module 120 for sampling applications on a mobile device for detecting performance problems. The sampling module 120 can be a discrete application program, or the module 120 can be integrated into another application program or the mobile device's 110 operating system. In some embodiments, a portion of the sampling module 120 is executed on the server 116 or in a cloud computing environment. In brief summary, the sampling module 120 periodically logs performance information for a mobile device 110 and identifying information about applications on the mobile device 110. The module 120 periodically provides this logged information to the security server 116, and provides copies of certain of the applications to the server 116, upon the server's request, for analysis of the applications' impact on mobile device performance. The module 120 also receives from the server 116 an indication of which applications are causing performance problems on the mobile device 110 and can notify the user or mobile service provider 117, which can then take corrective action, ban the application, etc.

Figure 2:
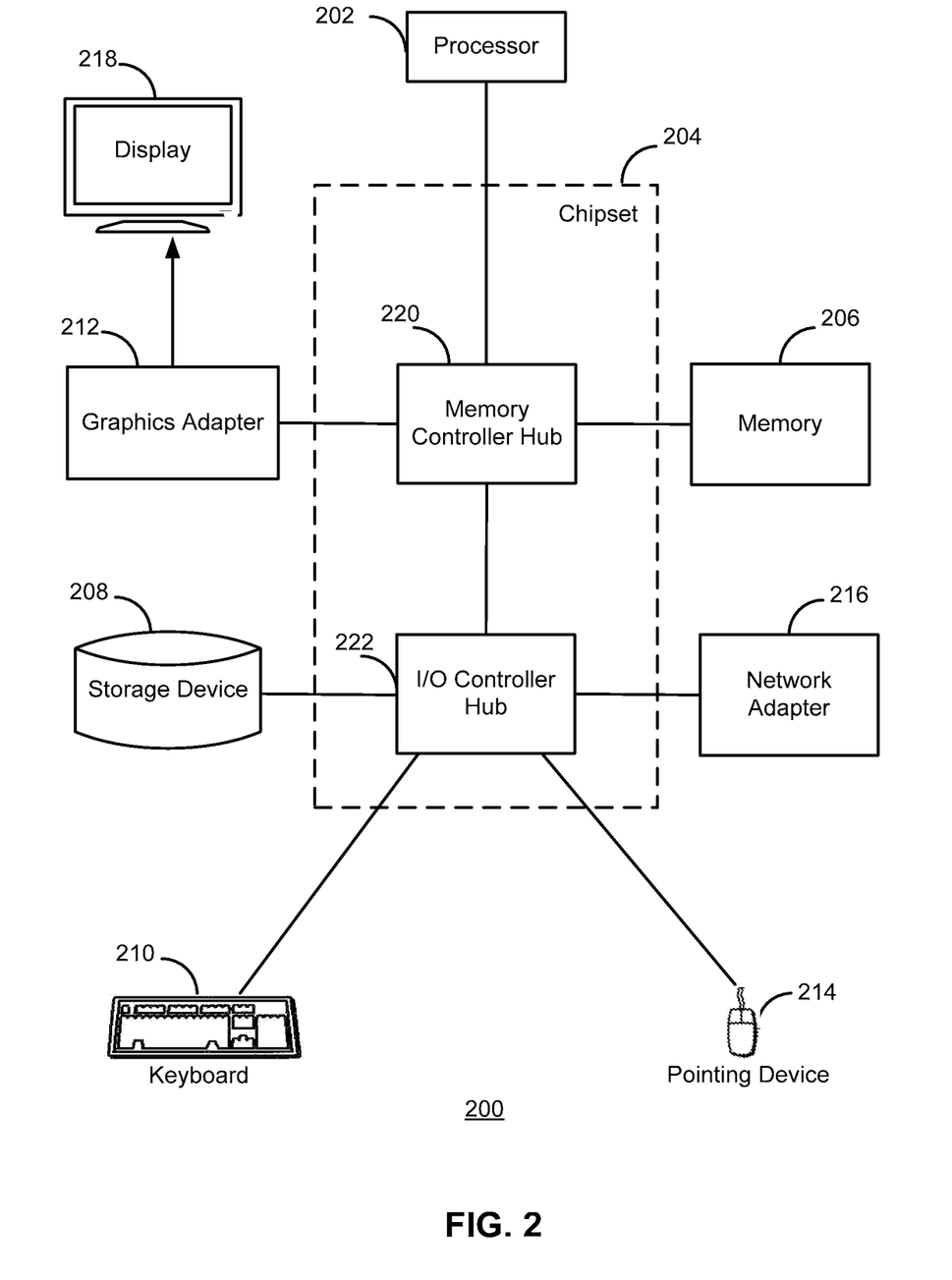
FIG. 2 is a high-level block diagram illustrating a computer system 200 for use with the present invention.

FIG. 2 is a high-level block diagram illustrating an example of a computer 200 for use as a server 116 and/or mobile device 110. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, certain mobile devices 110, including handheld devices, typically have limited processing power, a small display 218, and could lack a pointing device 214. The server 116, in contrast, may comprise multiple blade servers working together to provide the functionality described herein.

Figure 3A:
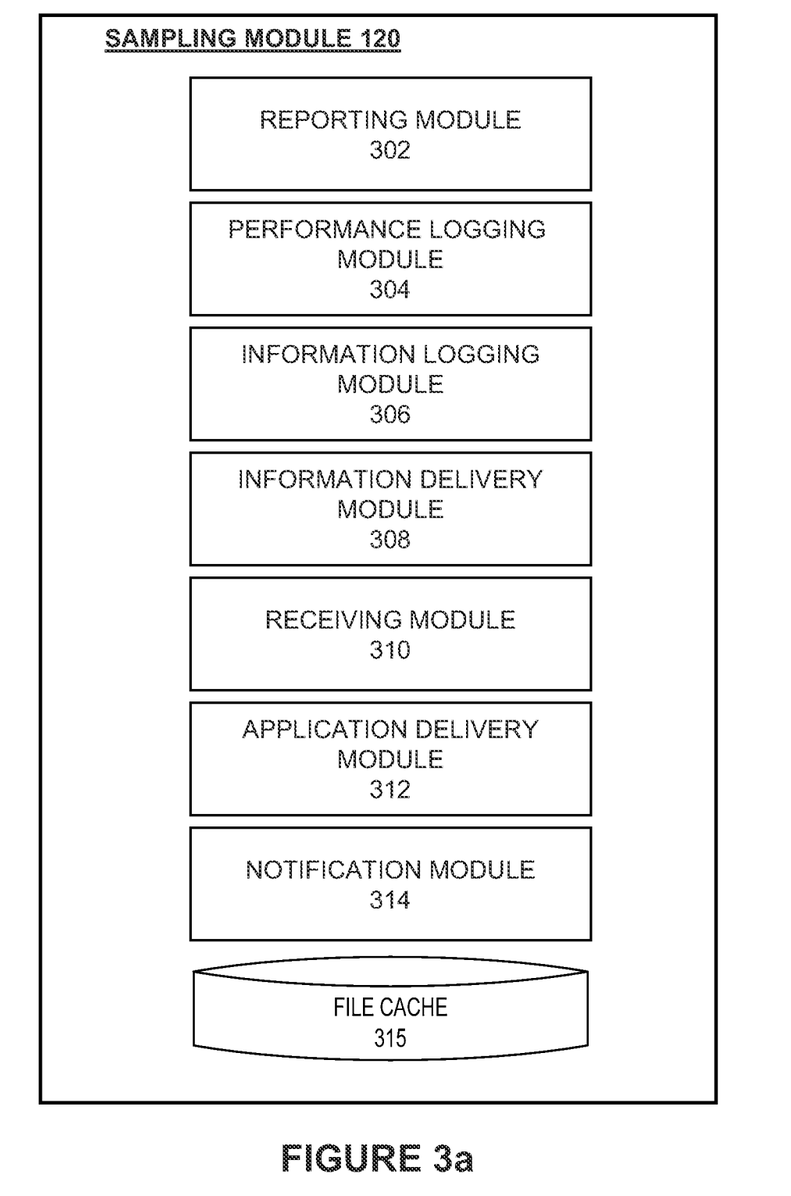
FIG. 3a is a high-level block diagram illustrating the functional modules within the sampling module 120, according to one embodiment of the present invention.

FIG. 3a is a high-level block diagram illustrating the functional modules within the sampling module 120, according to one embodiment of the present invention. The sampling module 120, in the embodiment illustrated in FIG. 3a, includes a reporting module 302, a performance logging module 304, an information logging module 306, an information delivery module 308, a receiving module 310, an application delivery module 312, a notification module 314, and a file cache 315. Some embodiments of the sampling module 120 have different and/or additional modules than those shown in FIG. 3a and the other figures. Likewise, the functionalities can be distributed among the modules in a manner different than described herein. Certain modules and functions can be incorporated into other modules of the sampling module 120 and/or other entities on the network 112, including the server 116.

In some embodiments, the reporting module 302 receives instructions from the server 116 that it should conduct sampling of the applications on a mobile device 110. For example, the server 116 might learn that the mobile device 110 is having performance problems or is causing anomalous or problematic network traffic. The server 116 might learn this from a mobile service provider 112, from the mobile device 110 or mobile device user, or from any other requesting entity interested in information regarding mobile device performance problems. In some embodiments, the system 100 is a mobile device review service in which an entity can submit information to the server 116 about a particular mobile device 110 or a particular mobile application (e.g., one suspected of causing performance issues) about which the entity would like more information. For example, the mobile service provider 117 can detect that a particular mobile device 110 is causing anomalous or problematic network traffic or may receive user complaints about a device 110. The service provider (or the user) can report this device to the server 116 for analysis. This reported data can be used to trigger sampling and analysis on those devices, or could be used after the sampling/analysis is complete to correlate performance or behavior analysis afterwards (i.e., to confirm that a mobile device found to be problematic by the sampling/analysis likely is problematic since it was also detected to be a problem by the mobile service provider 117 or user).

In some embodiments, the mobile service provider 117 may not be capable of associating the anomalous or problematic network traffic with a particular device 110 (i.e., the particular device causing the problems is unknown). However, the provider may be able to associate this traffic with a given geographic area (e.g., the state of California, the city of Santa Monica, etc.), with a given time-frame (e.g., during the afternoon, from 2 a.m. to 4 a.m., or during some other time period), with a given device type (e.g., all BLACKBERRY® phones, etc.), and so forth. In these situations, the mobile service provider 117 can compare logs from a sample of mobile devices 110 in a given geographic area (or time-frame, device type, etc.) with another sample set of logs from a different geographic area (or time-frame, device type, etc.) with the intent of discovering the new or different applications or behavior on the mobile devices that are likely causing the problematic network traffic. The mobile service provider 117 can report this data to server 116, which then instructs the reporting modules 302 on devices 110 in those geographic areas (in those time-frames, of those device types) to conduct application sampling or to increase the rate of sampling in those areas or time-frames, or with regard to those devices. In some embodiments, the module 302 receives instructions from the server 116 that include sampling criteria or guidelines regarding what sampling to conduct. For example, the module 302 could receive instructions to sample (or increase sampling) if you are in the Santa Monica area or some other defined region, and the module 302 can determine if it is, and then conduct sampling (or increase the sampling rate).

In other embodiments, the sampling/analysis is performed on all mobile devices or all devices for certain mobile service providers 117 without any submission of a particular device or region to analyze. In this case, the reporting module 302 might only receive sampling instructions when the rate of sampling/analysis needs to be increased for certain areas, times of day, device types, particular mobile devices/applications, etc.

There can be various different performance problems being caused by the mobile device 110 or application on the device 110. For example, there can be problems with the battery life for the device (e.g., excessive or unusually rapid battery drain) where the application has behaviors that cause the battery to drain more rapidly than batteries drain for other mobile devices not executing the application. As another example, there can be problems with over-usage by the application of bandwidth of the device or issues with CPU usage (i.e., causing the device to run slower than normal or not function properly). As a further example, the problems can affect the user experience, where the application displays behaviors that cause a more negative user experience than is caused by behaviors of other applications (i.e., the device runs slowly, crashes or locks up frequently, does not function properly, or otherwise disturbs or frustrates the user). The problems caused by the application can also affect all or a portion of the network. For example, the application can cause a disproportionately slower network performance for all mobile devices on the network, or can use a disproportionately larger amount of network resources than are used by other mobile devices, and so forth. In some cases, the device is determined to have performance problems when it is using more than a threshold percentage (e.g., 5%, 25%, 50%, 75%, etc.) of battery life, network or device bandwidth, CPU, etc., or a threshold percentage per time period (e.g., per minute, per hour, per day, per week, per month, etc.). Similarly, the application could be causing network performance that is slower then a threshold level, or a user experience that is below a threshold level.

The performance logging module 304 periodically logs performance information for a mobile device 110 suspected to be having performance problems. For example, the module 304 can log information about the amount of bandwidth that is being used on a device, or about the battery life for the device. As another example, the module 304 can log information about how often the device crashes or locks up, about errors on the device, or other notifiers indicating functionality problems. In addition, the module 304 can log information about the network performance, about the network utilization, or about the CPU utilization. As used herein, the term "periodically" means once in a while, or at different periods of time, where the periods do not have to be regular (e.g., every day, every week, every month, each time new information is collected, each time a new application is installed, each time the device crashes, and so forth).

The information logging module 306 periodically logs identifying information about the applications on the mobile device 110. For example, the module 306 can log a hash (or signature or checksum) of the application, the name of the application, the size of the application, etc. The module 306 also log a variety of other identifiers for the application, including but not limited to the application version, the installation date, information about download of recent or past updates or patches for the application, errors caused by the application, security flags raised due to the application, recent or past actions taken by the application, and so forth.

The information delivery module 308 periodically provides to the security server 116 the logged performance information for the mobile device 110 and the logged identifying information about the applications. The module 308 can send the performance information and the identifying information at the same or at different times. The information sent can vary from one send to the next. For example, the module 308 might send a name, size, and hash of the application once, and the next time send a hash of the application along with battery drainage and bandwidth usage data. In one embodiment, the module 308 periodically does a batch upload of logged information to the server 116. For example, the module 308 can periodically send hashes of all applications on the device to the server 116 for the server to process in batches.

In some embodiments, the amount of information logged by modules 304, 306 and/or the rate at which information is provided to the server 116 by module 308 can vary. In embodiments in which the reporting module 302 has received an indication of performance/network problems in a particular geographic regions, at certain times of day, or for certain device types, the information delivery module 308 can increase the sampling rate or the rate at which the logged information is collected/provided to the server 116. For example, if it is determined that problems are being caused by VERIZON WIRELESS users, the modules 304, 306, 308 can collect/provide information more frequently for devices using the VERIZON WIRELESS services. Similarly, the sampling could be increased for all iPHONE users in West Los Angeles. Thus, whatever granularity is needed for the correlation between applications and performance problems can be instituted.

In some embodiments, the receiving module 310 receives a response from the server 116 regarding the information sent by module 308. The response can be a request by the server 116 for more information about certain of the applications for which information was provided. Specifically, the server 116 might request copies of applications that the security server has not seen before or that are not already known by the server 116 to be clean or non-performance impacting applications.

The application delivery module 312 can provide a copy of the requested applications to the security server 116 for analysis of their impact on performance of the mobile device 110. In some embodiments, the response received by the receiving module 310 automatically triggers an upload from the mobile device 110 of copies of certain of the applications associated with the received information. The application delivery module provides the copies of the applications to the security server 116 for server to analyze, including determining the impact on user experience, network environment, device environment, etc.

Once the analysis has been conducted by the server 116 and certain applications have been identified as problematic, the receiving module 310 of the mobile device 110 may receive from the server 116 an indication of which applications are causing the problems. If none of the applications were determined to be causing performance problems, the receiving module 310 might send or notification of this to the module 310 or may simply provide no response, which indicates that none of the applications were determined to be causing performance problems.

In some embodiments, the receiving module 310 then stores, in the file cache 315, the identifying information of certain applications analyzed by the security server 116. For example, the module 310 can store information about each clean application (e.g., applications that are known not to cause performance problems for mobile devices). In this case, the file cache 315 is a clean file cache or a whitelist for known good applications. The module 310 can determine which files are clean based on information received from the server 116. For example, the server 116 can send a list of the applications determined to be clean. As another example, the server 116 can send an indication of which applications are causing problems (e.g., to the receiving module 310 described above), and the module 310 can deduce from this information that the remaining files for which logged information and/or copies were sent to the server 116 are clean. In other embodiments, the cache 315 can store information about dirty or bad applications known to cause performance problems. In this case, the cache 315 can act as a blacklist of known problem-causing applications.

In addition, the information in the file cache 315 can be used to streamline the overall sampling process. In one embodiment, before the logged information is provided to the server 116 by information delivery module 308, the module 308 can compare applications on the mobile device 110 to the information for applications in the file cache 315. Based on this comparison, the module 308 can decide what application copies to provide to the server 116. For example, where the cache 315 is a clean file cache, the module 308 can provide information only for applications not in the file cache 315. As another example, the application delivery module 312 can automatically upload to the security server 116 copies of all applications on the mobile device 110 that are not included as clean files the cache 315 without waiting for a request from the server 116 for certain applications. As still another example, the information logging module 306 might only collect identifying information for applications that are not included as clean files in the cache 315. Thus, the file cache 315 can be used to save bandwidth used by unnecessary information collecting and/or uploading of applications to the server 116.

Where the device 110 received a notification from the server 116 regarding bad applications on the device 110, the notification module 314 of the mobile device 110 can notify the user of this problem. For example, the module 314 can provide or cause the device 110 to provide a dialog box with the notification, or to provide an option to uninstall or remove the application from the mobile device 110 or to download a patch for or otherwise try to repair the application, and so forth.

To minimize the impact on the device 110 and the user, the sampling module 120 can limit the sampling and checking in with the server 116 to times when the device 110 is not in use or not be interacted with by the user (i.e., when the device is sitting idle) or when it is charging (e.g., to avoid battery drainage by the module 120). Similarly, the sampling module 120 could take action or perform certain steps during times of day when the device is not likely being used (e.g., from 2 a.m. to 4 a.m.) or when bandwidth is at a lower cost (e.g., nights and weekends). Further, while the sampling module 120 may be present on the device 110, it may not always be actively sampling. In some embodiments, the mobile service provider 117 or other entity can control the sampling, and can selectively turn it on or tune it up for certain regions.

Figure 3B:
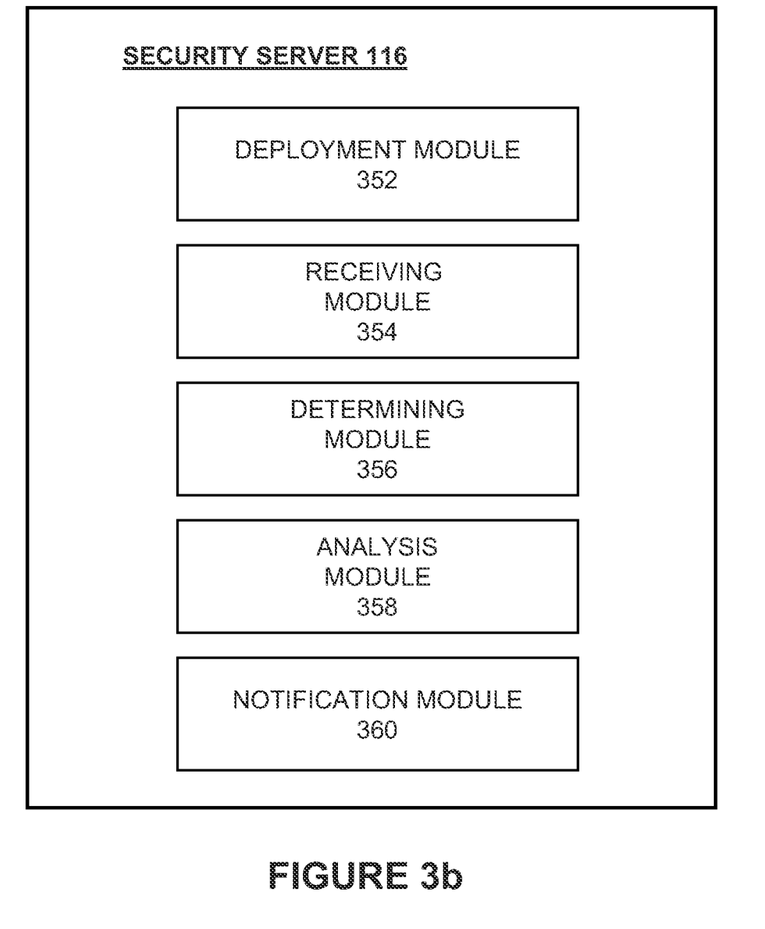
FIG. 3b is a high-level block diagram illustrating the functional modules within the security server 116, according to one embodiment of the present invention.

FIG. 3b is a high-level block diagram illustrating the functional modules within the security server 116, according to one embodiment of the present invention. The security server 116, in the embodiment illustrated in FIG. 3b, includes a deployment module 352, a receiving module 354, a determining module 356, an analysis module 358, and notification module 360.

The receiving module 354 of the security server 116 receives an indication about a particular mobile device (or application) for which sampling should be conducted or increased. The module 354 can also receive an indication that there is a problem in a certain geographic region (at a certain time of day, a certain device type, etc.) being caused by an unknown device 110.

The deployment module 352 of the security server 116 determines on which devices 110 the sampling should be conducted. If these devices 110 do not already have sampling modules 120, the deployment module 352 deploys a sampling module 120 to each of various mobile devices 110. In some embodiments, the modules 120 are deployed to devices indicated to the server 116 (e.g., by a mobile service provider) to have performance problems or to be running an application that is suspected to be problematic. In other cases, the sampling modules 120 are deployed to all mobile devices 110 (or all devices in certain regions, all devices of a particular type, for certain mobile service providers, etc.) without waiting for any indication of problems, so that sampling can be conducted when needed.

The receiving module 354 periodically receives 504 from the sampling module 120 logged performance information for the mobile device 110 and logged identifying information about applications on the mobile device 110. Based on this information, the server 116 can determine what applications are present on the mobile device 110 currently, and the current status of device performance.

The determining module 356 determines whether the applications for which identifying information was received have been seen before by the server 116 (i.e., are not new to the server 116) or are already known to the server 116 to be applications that do not cause performance problems (e.g., clean applications). For all other applications (e.g., unknown applications or applications not known to be clean), the module 356 can request a copy of each for further analysis. The receiving module 354 described above can receive from the sampling module 120 the copies of the certain applications requested. In some embodiments, the module 120 determines for itself which applications are known to be clean (e.g., using the file cache 315 on the mobile device 110) and forwards copies of all of the other applications to the server 116 without the server's request.

The analysis module 358 analyzes the certain applications for which copies were provided to the server 116. The module 358 thus determines whether the certain applications are causing performance problems for the mobile device 110. In one embodiment, the module 358 performs the analysis by executing the applications in an emulator or on a virtual machine to observe the impact of the application on bandwidth and battery life of a mobile device 110, on user experience, on network environment, on mobile device environment, etc. In some cases, the module 358 can also determine if any of the applications are malware. For example, the module 358 can execute the applications in an emulator/virtual machine to see if the applications display malware characteristics, such as attempting to damage the machine, trying to access and/or sending out personal information, etc. As used herein, "malware" is any code that enters a device without an authorized user's knowledge and/or without an authorized user's consent with the intention of conducting malicious activities on that device or on other devices. In addition, if anomalies are detected for mobile devices 110 in certain geographic regions (at certain times, with certain devices) and not in others, the module 358 can compare this data to regions that are not experiencing these anomalies to determine what is the key differentiator (e.g., a particular application or other factor that is causing the anomaly).

One mechanism for performing the analysis and testing of applications by the module 358 is to use vendor-provided simulators and performance tools provided for developers of mobile platforms. Mobile platforms typically provide a software simulator to enable developers to test software without a physical device. In another embodiment, the module 358 monitors these simulators to observe how much processing power, network resources, and storage is used by an application. This information can be translated (even without knowledge of the particular simulator) into the expected impact on the mobile device 110. Some simulators offer additional interfaces, usually intended for debugging, to allow more detailed monitoring of processes, applications, input/output, etc. Further, some simulators provide either performance-monitoring tools to use with the emulators or interfaces for third-party tools. These are normally used by developers to fine tune application performance and make modifications. However, the module 358 can also use these performance-monitoring tools to automatically measure aspects of performance for an application and generate an evaluation of the application's impact on mobile devices 110.

The analysis module 358 can provide the results of the analysis to a reputation system for updating a reputation of the application. The reputation information can be stored in a database such as database 111 in FIG. 1. The reputation can be updated in terms of whether or not the application is malware and in terms of the application's impact on user experience, network environment, device environment, etc. This information can be used as a blacklist (list of bad applications) or whitelist (list of good or clean applications) for use in detecting the source of performance problems in other mobile applications. For example, mobile service providers 117 can use this information to ban usage of blacklisted applications on mobile devices 110 using that provider's mobile service. As used herein, the term "reputation" represents an assessment of the likelihood that an activity performed by an application is malicious (e.g., is a computer-related threat) or that an activity performed by an application is causing a negative performance impact on a mobile device 110. An activity that is believed to be malicious or is having a negative performance impact will have a poorer reputation than an activity that is not likely malicious/having a negative impact.

In some embodiments, the sampling module 120 is included as part of a mobile device security client application that identifies problematic applications using a reputation-based system. The information provided by the sampling module 120 can be used in combination with other reputation information provided to the security client by a reputation system, which can be together be used in determining which applications are problematic and should be banned, repaired, or otherwise require action (e.g., blacklisted applications). Similarly, the overall system 100 can be a mobile device review service to which a mobile service provider 117 or other entity submits identification of a mobile device 110 or application suspected to be causing problems, and receives a reputation analysis of that mobile device 110 or application.

The notification module 360 can notify the mobile device 110 (or user), mobile service provider 117, and/or other entity of the analysis results. For example, the module 360 can notify a service provider 117 of all applications that are determined to be negatively impacting mobile device performance. As another example, the module 360 could similarly notify one or more of these entities that an application is using more than the threshold level of battery life, bandwidth, CPU, etc. In some embodiments, no notification is provided, or the notification is provided via a mobile security client or mobile review service, as explained above.

Once the mobile service provider 117 is aware that a particular application has been determined to be causing performance issues, the provider 117 can take various actions to manage this problem. As an example, the mobile service provider 117 might notify the mobile device user (where the user was not already notified), might attempt to repair the application or require download of a patch, might ban the application from all mobile devices, might send out a warning to numerous mobile users regarding the application, might notify the application vendor, and so forth. Legitimate vendors of applications with a problematic impact on devices can be notified so they can take corrective action. Mobile service providers 117 can provide a significant incentive for corrective action by banning identified applications that do not meet performance guidelines.

Figure 4:
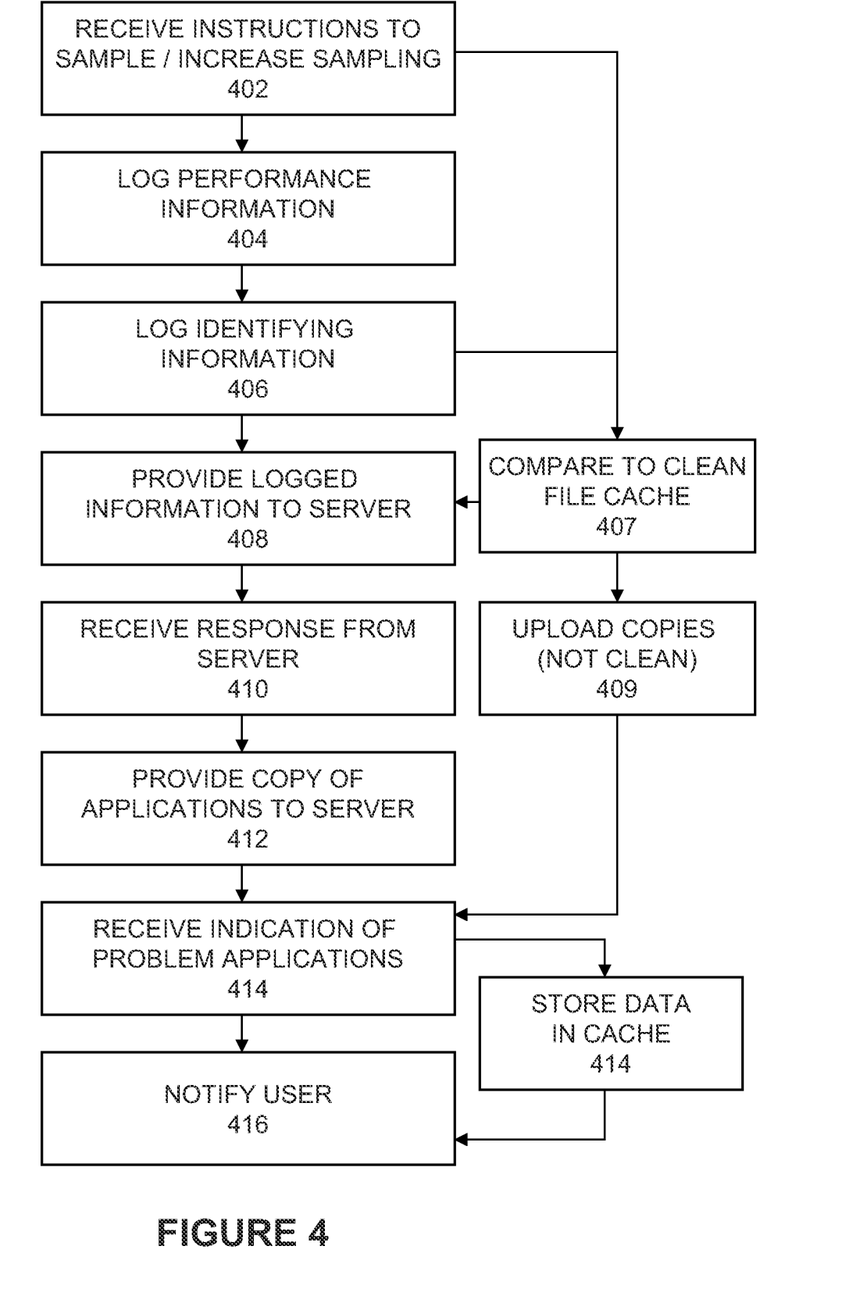
FIG. 4 is a flowchart illustrating steps performed by the sampling module 120, according to one embodiment of the present invention.

Referring now to FIG. 4, there is shown a flowchart illustrating the operation of the sampling module 120, according to some embodiments of the present invention. It should be understood that these steps are illustrative only. Different embodiments of the sampling module 120 may perform the illustrated steps in different orders, omit certain steps, and/or perform additional steps not shown in FIG. 4 (the same is true for FIG. 5).

As shown in FIG. 4, the sampling module 120 receives 402 instructions (e.g., from the server 116) that it should begin sampling applications on the device 110 (or increase the rate of sampling that is already being conducted). In some embodiments, the periodic sampling is conducted automatically by the module 120 without specific instructions. The sampling module 120 periodically logs 404 performance information for the mobile device 110. The module 120 also periodically logs 406 identifying information (e.g., a hash, a name, or a size of the application, etc.) about applications on the mobile devices 110. The module 120 periodically provides 408 to a security server 116 the logged information to the server 116. In embodiments in which the module 120 has received 402 an indication of performance/network problems in a particular geographic regions, at certain times of day, or for certain device types, the module 120 can begin sampling or increase the rate at which the logged information is collected 404, 406 or provided 408 to the server 116 for that region (time, device type, etc.).

In some embodiments, the module 120 receives 410 a response from the server 116 regarding the information sent that requests or otherwise triggers an upload from the mobile device 110 of copies of certain of the applications associated with the received information. Specifically, the server 116 might request copies of applications that the security server has not seen before or that are not already known by the server 116 to be clean or non-performance impacting applications. In response to a request from the security server 116 for more information about one of the applications, the module 120 provides 412 a copy of the application to the security server 116 for performance analysis. The module 120 can then receive 414 from the security server 116 an indication of applications that are causing performance problems on the mobile device 110.

In some embodiments, the module 120 stores 415 in a file cache 315 the identifying information of the applications that are identified to be clean or non-performance impacting (or for applications identified to be dirty or known to cause problems). In some embodiments, before providing 408 the information to the server 116, the module 120 compares 407 applications on the mobile device to the identifying information for applications in the file cache 315 to determine which applications are identified in the cache. Based on this comparison 407, the module 120 uploads 409 to the security server copies of only the applications on the mobile device that are not known to be clean. In this case, steps 408, 410, and 412 can be skipped. In some cases, the module 120 only provides 408 logged information for, or only logs 404, 406 information for, applications not identified in the cache 315 as clean files. The module 120 can notify 416 the user that the application has been determined to be causing performance or network problems.

Figure 5:
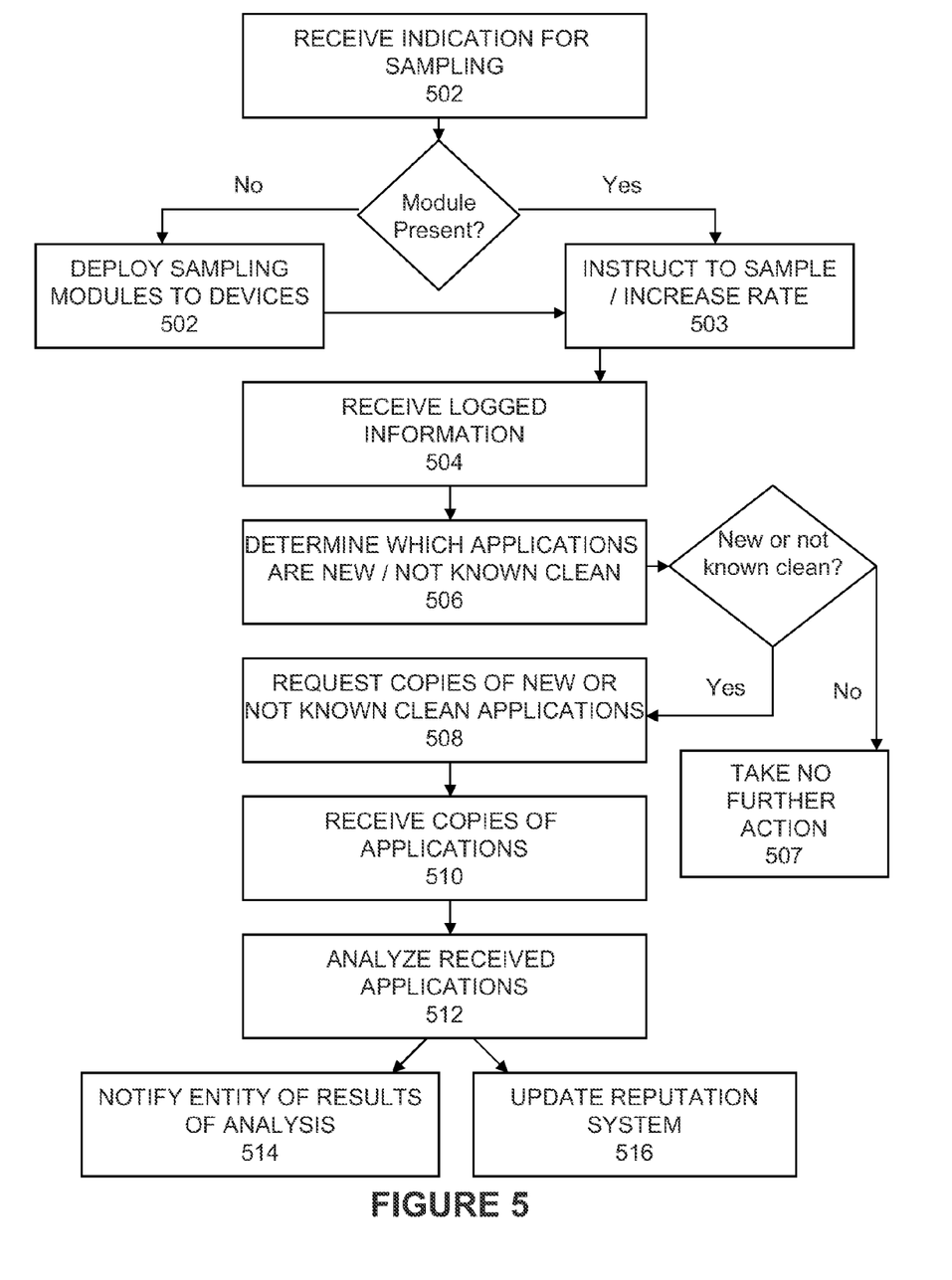
FIG. 5 is a flowchart illustrating steps performed by the security server 116, according to one embodiment of the present invention.

Referring now to FIG. 5, there is shown a flowchart illustrating the operation of the security server 116, according to some embodiments of the present invention. In some embodiments, the security server 116 receives 501 an indication about a particular mobile device (or application) that is suspected to be having or causing performance issues or receives 501 an indication that sampling should be conducted for all devices 110 of a particular geographic region (certain time of day, a certain device type, etc.). If these devices 110 do not have a sampling module 120 already, the server 116 deploys 502 a sampling module 120 to each of the devices 110, which the server 116 then instructs 503 to conduct or sampling. If the devices already have a module 120, the server 116 instructs 503 these modules 120 to begin sampling, or increase the rate of sampling. The server 116 periodically receives 504 from the sampling module 120 logged performance information for the mobile device 110 and logged identifying information about applications on the mobile device 110.

The server 116 then determines 506 which of these applications have been seen before or are not known to be clean, for which the server 116 requests 508 a copy of those certain applications for further analysis. Where none of the applications are new or are not known to be clean, the server 116 takes 507 no further actions. The server 116 receives 510 from the sampling module 120 the copies of the certain applications for analysis, and analyzes 512 those applications to determine whether they are causing performance problems for the mobile device 110. In response to determining that one the certain applications is causing performance problems, the server 116 can notify 514 the mobile device or mobile service provider 117 (or other requesting entity) of this information. The server 116 can also update 516 a reputation system for mobile devices to identify the certain applications as ones that cause performance problems. This reputation information can be used in future performance analyses on applications.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer-implemented method of logging applications on a mobile device for detecting performance problems, the method comprising:
    periodically logging, at a mobile device suspected to be having performance problems, performance information for the mobile device;
    periodically logging, at the mobile device, identifying information about a plurality of applications on the mobile device;
    receiving instructions from a security server to increase a rate of logging the performance information for the mobile device and the identifying information about the applications, wherein the mobile device is one of a plurality of mobile devices located in a particular geographic region and the mobile devices located in the particular geographic region receive the instructions responsive to performance problems located in the geographic region;
    periodically providing to the security server the logged performance information for the mobile device and the logged identifying information about the applications;
    responsive to a request from the security server for more information about one of the applications, providing a copy of the application to the security server for analysis of an impact by the application on performance of the mobile device; and
    receiving, from the security server, an indication that the application for which the copy was provided is causing a performance problem on the mobile device and storing the indication in a file cache of information about applications known to cause performance problems, the mobile device adapted to take a remedial action regarding the application.

2. The method of claim 1, wherein logging performance information further comprises logging information about battery life of the mobile device and a rate of drainage of battery power over a period of time.

3. The method of claim 1, wherein logging performance information further comprises logging information about bandwidth usage of the mobile device over a period of time.

4. The method of claim 1, wherein the periodically providing step further comprises periodically sending a hash for each of the applications on the mobile device, the hashes received for the security server to process in batches, and wherein providing a copy of the application to the security server further comprises receiving a response from the server regarding the hashes sent that triggers an upload from the mobile device of copies of certain of the applications associated with the received hashes, the certain of the applications uploaded being files specified by the security servers that the security server has not seen before.

5. The method of claim 1, further comprising receiving instructions from the security server to begin logging or to increase a rate of logging already being performed.

6. The method of claim 1, wherein the instructions include logging criteria guiding the increased rate of logging.

7. The method of claim 1, wherein the mobile devices receive instructions from the security server to begin logging.

8. The method of claim 1, wherein the mobile device is suspected to be having a performance problem caused by malicious activities conducted by an application of the plurality of application on the mobile device.

9. A non-transitory computer-readable storage medium storing executable computer program instructions for logging applications on a mobile device for detecting performance problems, the computer program instructions comprising instructions for performing steps comprising:

periodically logging, at a mobile device suspected to be having performance problems, performance information for the mobile device;

periodically logging, at the mobile device, identifying information about a plurality of applications on the mobile device;

receiving instructions from a security server to increase a rate of logging the performance information for the mobile device and the identifying information about the applications, wherein the mobile device is one of a plurality of mobile devices located in a particular geographic region and the mobile devices located in the particular geographic region receive the instructions responsive to performance problems located in the geographic region;

periodically providing to the security server the logged performance information for the mobile device and the logged identifying information about the applications;

responsive to a request from the security server for more information about one of the applications, providing a copy of the application to the security server for analysis of an impact by the application on performance of the mobile device; and     receiving, from the security server, an indication that the application for which the copy was provided is causing a performance problem on the mobile device and storing the indication in a file cache of information about applications known to cause performance problems, the mobile device adapted to take a remedial action regarding the application.

10. The computer-readable storage medium of claim 9, further comprising:

storing in a clean file cache the identifying information of applications determined by the security server to be clean applications that do not cause performance problems for mobile devices;

comparing applications on the mobile device to the identifying information for applications in the clean file cache to determine which applications are present in the cache; and     uploading to the security server copies of applications on the mobile device that are not included in the clean file cache.

11. The computer-readable storage medium of claim 9, wherein the identifying information logged comprises a name and size of each of the applications.

12. The computer-readable storage medium of claim 9, wherein at least the periodically logging steps and the periodically providing step are performed while the mobile device is not being interacted with by a user or is being charged.

13. A computer implemented method of collecting data about applications on mobile devices that negatively impact device performance, the method comprising:

responsive to performance problems detected in a geographic region, instructing sampling modules on a plurality of mobile devices located in the geographic region to increase a rate of logging of applications;

periodically receiving, from the sampling modules, logged performance information for each of the mobile devices and logged identifying information about a plurality of applications on each of the mobile devices;

requesting, from the sampling modules, copies of certain of the applications for which logged information was received;

analyzing the received copies to identify applications that are conducting behaviors that cause performance problems on the mobile devices; and     providing a notification about one or more of the applications that were identified to cause performance problems on the mobile devices, the notification resulting in the mobile devices storing the notification in a file cache of information about applications known to cause performance problems and a remedial action being taken regarding the identified applications.

14. The computer-implemented method of claim 13, further comprising receiving an indication from a mobile service provider to conduct application logging for one or more specified mobile devices known to be having performance problems in a particular geographic region.

15. The computer-implemented method of claim 13, wherein analyzing the received copies further comprises executing the received application copies in an emulator or on a virtual machine to observe an impact of the applications on bandwidth and battery life of the mobile devices.

16. The computer-implemented method of claim 13, wherein analyzing the received copies further comprises updating a reputation system regarding results of the analysis of the applications regarding impact on user experience, network environment, and device environment.

17. The computer-implemented method of claim 13, wherein the steps are performed by a security server managing a mobile device review service in which a mobile service provider submits to the server an identification of an application suspected to be causing problems and receives from the server a reputation analysis of that application.

18. The method of claim 1, further comprising:

receiving instructions from the security server to increase a rate of providing to the security server the logged performance information for the mobile device and the logged identifying information about the applications.

* * * * *